March 27, 1956  H. WURZEL  2,739,615
CONNECTORS
Filed Jan. 6, 1954
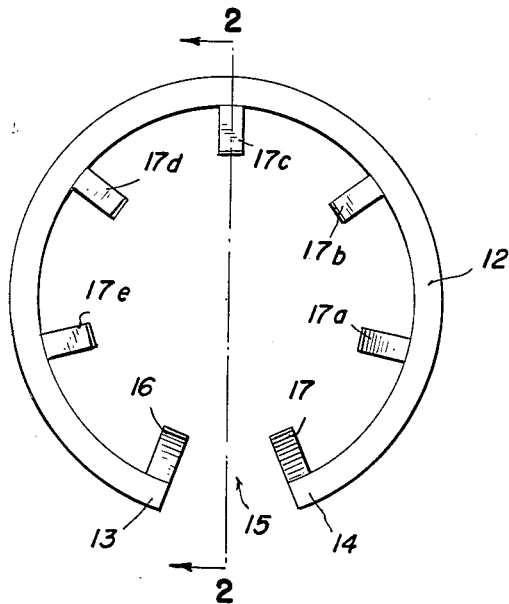
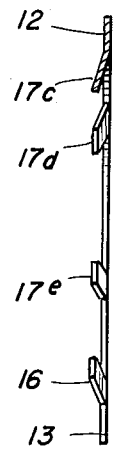
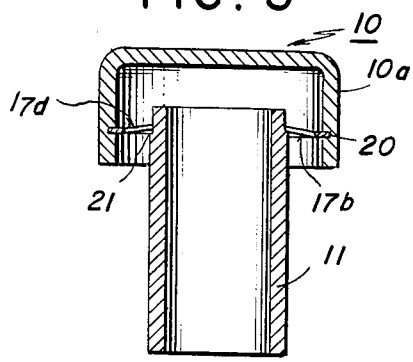
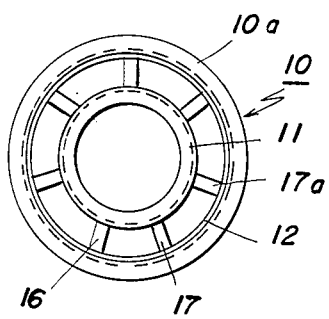
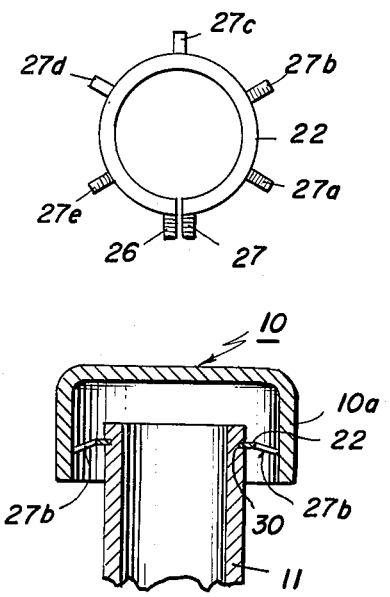
INVENTOR
HUGO WURZEL
BY
ATTORNEY овеrunited States Patent Office 2,739,615
Patented Mar. 27, 1956

2,739,615

CONNECTORS

Hugo Wurzel, Bronx, N. Y., assignor to Waldes Kohinoor, Inc., Long Island City, N. Y., a corporation of New York Application January 6, 1954, Serial No. 402,520

4 Claims. (Cl. 138—46.5)

This invention relates to improvements in a permanent connection between cylindrical members of different diameters, and more particularly to a means for permanently connecting a tubular member in encircling and radially spaced relation to a smaller-diameter internal cylindrical member, and to the connected assembly of such members.

A principal object of the invention is the provision of a connecting means for the above stated purpose, which is of simple and inexpensive construction and of a design such that it may be readily cooperated with the members to be connected, while at the same time being capable of providing an effective and thoroughly dependable interlock between said members.

Another object of the invention is the provision of an improved means for permanently connecting a tubular member in encircling relation to and about a smaller-diameter internal cylindrical member, in the form of a ring body adapted to be sprung into a groove provided in one of said members and having circumferentially spaced tongues or prongs which bridge the space between said members and whose ends lockingly engage the other member, whereby said connecting means not only connects said members against axial disengagement but also provides an annular passage between said members which may form a flow passage.

Yet another object of the invention is the provision of a spider-like form of connector between a tubular outer member and a smaller-diameter cylindrical inner member, characterized by an open-ended ring body made of spring metal capable of being assembled with one of said members similarly to a conventional spring retaining ring, and by spring fingers or prongs which project radially from an edge of said body an amount such that, following assembly of said connector, their free ends lockingly engage the adjacent surface of the other member, and which fingers are moreover inclined to the plane of said body in direction both as to facilitate assembly of said connector with said other member and, following such assembly, to tend to straighten in response to axial separating forces applied to said members, thereby to increase the locking action of their free ends.

A still further object of the invention is the provision of a connector characterized as in the foregoing, wherein the design of the ring body is such that it may be readily assembled in a groove of one of the members to be connected, as with a conventional retaining ring.

Yet a further object of the invention is the provision of a spring connector ring of spider-like construction for connecting a tubular member in encircling relation to a smaller-diameter inner cylindrical member, whose construction and design is such that, when assembled with said members, it resists axial separation thereof by spring pressure effective in both radial directions, and such that its resistance effect increases with the magnitude of the separating forces applied to said members.

Still another object of the invention is the provision of an assembly of an outer tubular member, an inner smaller-diameter member, and a spring connecting means bridging and locking said members together in such a way as not only normally to prevent their axial separation, but also to engender an increased locking effect with increase of the separating forces applied to said members.

The above and other objects, and advantages of a connection according to the invention will appear from the following detailed description thereof, reference being had to the accompanying drawings, wherein:

Fig. 1 is a plan view of a ring-form of connector according to one embodiment of the invention;

Fig. 2 is a section thereof taken along line 2—2;

Fig. 3 is a longitudinal section taken through a connected assembly of tubular outer member and smaller-diameter cylindrical inner member, wherein the connection is effected by a connector as shown in Fig. 1;

Fig. 4 is a bottom view of an assembly of the type shown in Fig. 3;

Fig. 5 is a plan view of a connector of the invention according to another embodiment; and Fig. 6 is a view similar to Fig. 3 but illustrating an assembly employing the Fig. 5 form of connector.

In the interest of simple disclosure, and not by way of limitation, the invention will be described in its application to the connection between the cap 10 sometimes applied to the tail end of the exhaust pipe 11 of an automotive engine, the cap serving to block rearward flow and instead direct the exhaust pipe forwardly along the latter. For this purpose, and as illustrated in Figs. 3 and 4, the cylindrical body 10a of the cap 10 has substantially greater diameter than the exhaust pipe 11 so that, when slipped over the pipe and locked thereto, an annular flow passage for the gases is provided.

Referring to Figs. 1 and 2, illustrating the constructional details of one form of connector according to the invention, such comprises a split or open-ended ring body 12 whose ends 13, 14 are spaced by a gap 15 whereby said body may be contracted by a pliers or similar tool. In the connector ring under description the outer edge of the ring body is continuous and uninterrupted, whereas its opposite or inner edge is provided with a plurality of prongs of fingers 16, 17—17e, which project radially inwardly a predetermined distance. Illustratively, seven such prongs are provided and they are equally spaced apart by an angle of approximately 50°, but it will be understood that the number and spacing of the prongs may vary. Both the ring body and prongs are made from spring metal, whereby the ring body when contracted tends to expand to its unstressed diameter, and the prongs, when bent out of their normal unstressed position, tend to return to said position. As best seen in Fig. 2, the prongs have a normal unstressed position in which they are bent out of the plane of the ring body by a small or acute angle. Preferably, two prongs (those designated 16, 17) are arranged to extend from the free ends 13, 14 of the ring body, so as to provide ring-end abutments for the tool by which the ring may be contracted in assembly.

In such a connector ring, the diameter of its continuous outer edge is made slightly larger than that of the surface against which it seats, for example, the bottom of a groove 20 provided in the inner wall of the cylindrical body 10a of the cap 10. Thus, when contracted into the cap body and released in the plane of said groove, the ring body 12 exerts spring pressure against the groove bottom which is sufficient to firmly seat it. The length of the prongs 16, 17—17e is such that their inner edges, which are formed arcuate, lie on a circle which has slightly smaller diameter than that of the external surface of the inner cylindrical part (exhaust pipe 11). Thus, when the connector ring is slipped over the pipe, with the prongs inclined oppositely to the direction in which the ring is moved, the prongs spread, i. e. yield and increase their inclination, and hence exert spring pressure against the outer circumference of the pipe.

In assembly of a connector ring as aforesaid, it is related to the cap 10 with its prongs facing towards the closed end thereof, whereupon it is contracted, as by engaging a pair of pliers over the ring-end prongs 16, 17, to an outside diameter less than that of the internal diameter of the cap body 10a. Held contracted by the pliers, the ring is now shifted axially into the cap and released in the plane of the groove 20, whereupon it seats with spring pressure against the groove bottom. With the connector ring now seated in the cap, the latter is pushed over the end of the exhaust pipe 10, during which operation the prongs 16, 17—17e yield, i. e. are further bent or inclined. When the cap 10 has been shifted over the pipe 11 the desired amount, which may be determined by a shoulder 21 provided in the outer surface of the pipe, the assembly is complete, since the cap is now permanently locked to the exhaust pipe. Such results from the fact that any tendency of the cap and pipe to separate is effectively resisted by the inner edges of the prongs 16, 17—17e biting more and more (up to the limits of the prongs giving away completely) into the outer surface or material of the pipe 11 as the separating force increases. At the same time, there is provided an annular flow passage between pipe and cylindrical cap body for the exhaust gases discharging from the pipe.

Figs. 5 and 6 show a reversal of the above described arrangement, according to which the inner edge of the ring body 22 is formed continuous and to a diameter which is somewhat less than the bottom of the groove in which it seats, whereby it must be expanded in its assembly in said groove. In the reversed form, the prongs 26, 27—27e extend radially outwardly from the outer edge of the ring body, are inclined oppositely to the prongs of the prior described prongs in assembly, and their outer arcuate edges extend on a circle of diameter somewhat larger than that of the inner diameter of the outer cylindrical member to be connected. Moreover, according to the reversed form, the groove 30 (corresponding to the prior described groove 20) is formed in the outer surface of the inner cylindrical member.

As in the prior modification, the reversed connector ring is illustrated as applied to the connection of a cap 10 having a cylindrical body 10a to the end of an exhaust pipe 11. In assembly, the reversed connector ring is spread by a suitable tool cooperated with the ring end prongs 26, 27 over the pipe end and shifted axially therealong to the plane of the groove 30, whereupon it is released to seat with spring pressure against the groove bottom. Due to the opposite inclination of the prongs 26, 27—27e, the cap may readily be pushed over the pipe end, the prongs yielding as required to permit this operation. Upon the cap being pushed over the pipe the desired amount, the assembly is complete since the prongs lock against the inner cylindrical surface of the cap body, that is to say, they bite more and more into the material of said surface with increase of any forces tending to separate the cylindrical member.

Without further analysis, it will be seen that connector rings according to both of the illustrated forms achieve the objectives therefor outlined in the foregoing. Such rings may be inexpensively produced in a simple stamping operation; they may be assembled to one of the cylindrical members to be connected as simply as open-ended retaining rings in wide use and, when so assembled, the other cylindrical member may be cooperated therewith to a final assembly by a simple push-on operation. When finally assembled, a secure connection between inner and outer cylindrical members is assured, as well as one that provides a space between said members which may be employed as a flow passage for gases and other fluids.

As many changes could be made in carrying out the above constructions without departing from the scope of the invention, it is intended that all matter contained in the above description or shown in the accompanying drawings shall be interpreted as illustrative and not in a limiting sense.

I claim:

1. An assembly comprising, in combination, a cylindrical member, a larger diameter tubular member encircling said cylindrical member, a groove provided in a surface of one of said members which is radially spaced from a complemental surface of the other of said members and a connector connecting said members in radially spaced relation and against axial separation comprising a radially deformable split ring body of spring material having a continuous seating edge and which is seated with spring pressure against the bottom of said groove, the ring body along its other edge being provided with radial prongs inclined at an angle to the ring body and whose ends bear with spring pressure against said complemental surface of the other member, the degree and direction of inclination of said prongs being such that they tend to straighten to the plane of the ring body and thereby elongate radially in accordance with axial separating forces applied to said members.

2. An assembly comprising, in combination, a cylindrical member, a larger diameter tubular member encircling said cylindrical member, a groove provided in the inner surface of the tubular member, and a connector connecting said members in radially spaced relation and against axial separation comprising a radially contractible split ring body of spring material having a continuous outer edge seating on the groove bottom and being provided along its inner edge with radial prongs whose inner ends lie on a common circle and extend to and tend to bite into the outer surface of said cylindrical member, said prongs being normally inclined to the plane of the ring body by an acute angle and in direction as to resist axial separation of said members, the ring body being contracted in said groove and the prongs being flexed to a greater than normal inclination, whereby said ring body and prongs exert radial pressure in opposite directions on said tubular and cylindrical members, respectively.

3. An assembly comprising, in combination, a cylindrical member, a larger diameter tubular member encircling said cylindrical member, a groove provided in the outer surface of said cylinder member, and a connector connecting said members in radially spaced relation and against axial separation comprising a radially contractible split ring body of spring material having a continuous inner edge seating on the groove bottom and being provided along its outer edge with radial prongs whose outer ends lit on a common circle and extend to and tend to bite into the internal surface of said tubular member, said prongs being normally inclined to the plane of the ring body by an acute angle and in direction such that they resist axial separation of said members, the ring body being spread consequent to its assembly in said groove and the prongs being flexed to a greater than normal inclination, whereby said ring body and prongs exert radial pressure in opposite direction on said cylindrical and tubular members, respectively.

4. An assembly as set forth in claim 1, wherein the complemental surface against which the prong ends bear is provided with a stop shoulder providing an abutment for said ends which limits relative axial movement of said members during their connection.

References Cited in the file of this patent

UNITED STATES PATENTS 1,891,460    Vlahek _____ Dec. 20, 1932

OTHER REFERENCES

Publication: Waldes Truare, copyright 1947, pages 1, 2, 4 and 7. (Copy in Div. 52, Pat. Off.)